June 30, 1964  W. R. EVANS  3,139,572
MEANS FOR INCREASING THE ACCURACY OF SYNCHROS OR THE LIKE
Filed Oct. 23, 1958  4 Sheets-Sheet 1
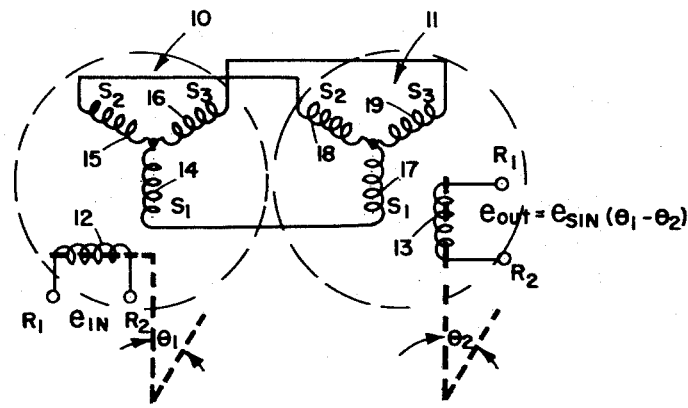
FIG. 1
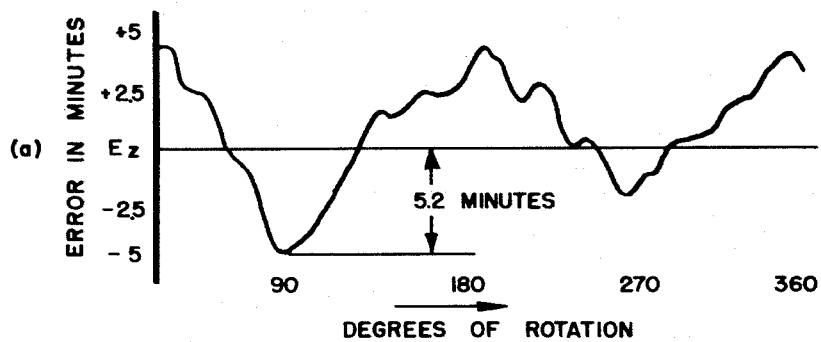
(a)
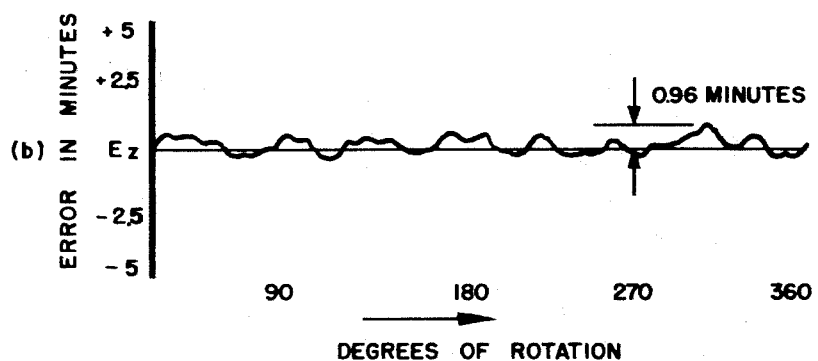
(b)
FIG. 2
INVENTOR.
WALTER R. EVANS
BY
AGENT

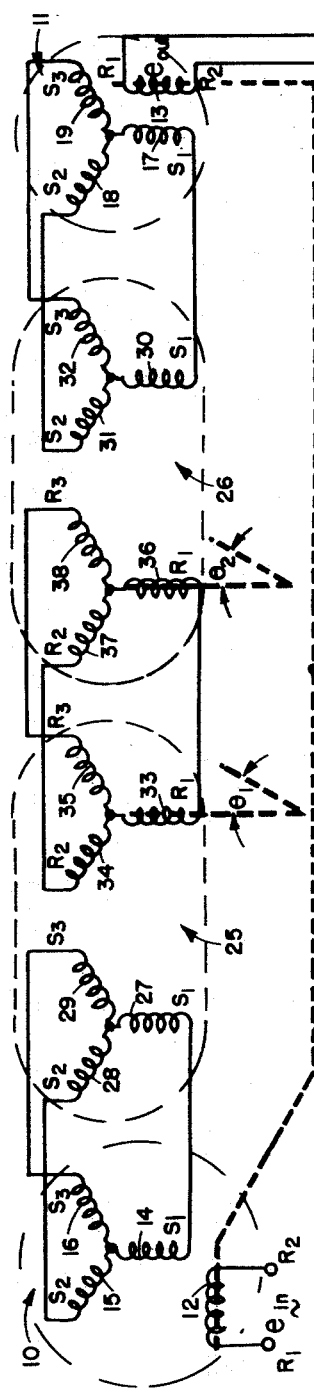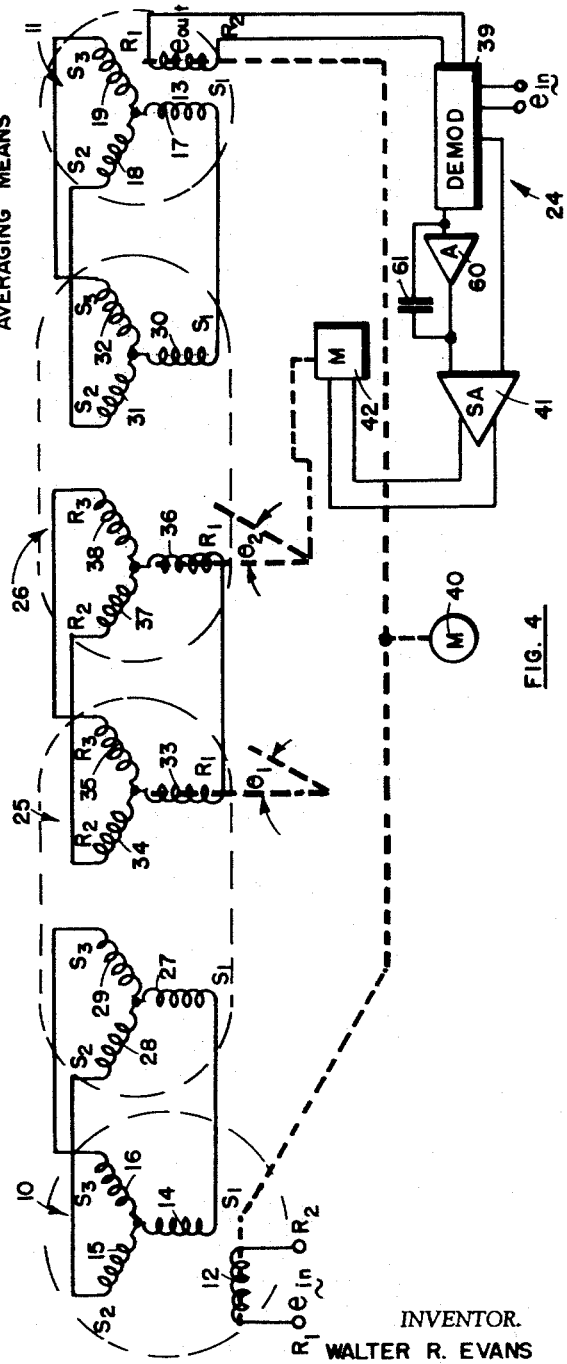
FIG. 3
FIG. 4
INVENTOR.
WALTER R. EVANS

June 30, 1964 W. R. EVANS 3,139,572
MEANS FOR INCREASING THE ACCURACY OF SYNCHROS OR THE LIKE
Filed Oct. 23, 1958 4 Sheets-Sheet 3

INVENTOR.
WALTER R. EVANS
BY *Louis J. Kobbe*
AGENT

June 30, 1964 W. R. EVANS 3,139,572
MEANS FOR INCREASING THE ACCURACY OF SYNCHROS OR THE LIKE
Filed Oct. 23, 1958 4 Sheets-Sheet 4

INVENTOR.
WALTER R. EVANS
BY
*Louis J. Knobbe*
AGENT

United States Patent Office

3,139,572
Patented June 30, 1964

3,139,572
MEANS FOR INCREASING THE ACCURACY OF SYNCHROS OR THE LIKE
Walter R. Evans, Whittier, Calif., assignor to North American Aviation, Inc.
Filed Oct. 23, 1958, Ser. No. 769,145
9 Claims. (Cl. 318—30)

This invention relates to an improved synchro system.
The term "synchro" is a generic one, covering a range of electromechanical elements which are used in data transmission and computing systems. Synchros are usually defined as instruments for providing a mechanical indication of a shaft position as the result of an electrical input or as devices which provide an electrical output which represents some function of the angular displacement of a shaft. Some of the more common synchros are known as torque-type synchros, control-type synchros, and resolvers.

Synchros presently known in the art have a basic similarity in that all are variable transformers, i.e., as the rotor of the synchro rotates, it couples and decouples one or more windings of the stator. Due to imperfect construction, synchros are subject to errors caused by such factors as non-uniform windings, off-center rotor axis, and eccentricities of the iron. My invention herein disclosed is a synchro in which many of these errors are cancelled.

It is accordingly an object of this invention to provide an improved synchro.

It is also an object of this invention to provide a very accurate synchro.

It is another object of this invention to provide an improved synchro system in which many of the errors are cancelled.

It is an additional object of this invention to provide a synchro system having a higher accuracy than that of the individual synchros incorporated therein.

Another object of this invention is to provide a high accuracy synchro made up of ordinary synchro elements.

Other and further objects, features, and advantages of the invention will become apparent as the description proceeds.

In ordinary synchro devices, the errors caused by imperfect construction vary for different positions of the rotor with respect to the stator. Thus, for any given rotor position, the errors may be additive, subtractive, or substantially zero. Moreover, for a complete revolution of the rotor with respect to the stator, the majority of the errors average to zero. In accordance with my invention, the axis of a pulsating magnetic field is rotated with respect to the synchro structure through a complete revolution whereby the cancellation of errors is achieved for each position of the synchro rotor with respect to the stator.

A more thorough understanding of the invention may be obtained by a study of the following detailed description taken in connection with the accompanying drawings in which FIG. 1 illustrates schematically a typical synchro system;

FIGS. 2a and 2b respectively illustrate typical error curves for the synchro systems illustrated in FIGS. 1 and 3;

FIG. 3 is a schematic diagram of one embodiment of this invention;

FIG. 4 is a schematic diagram of a servomechanism incorporating this invention;

Figure 5:
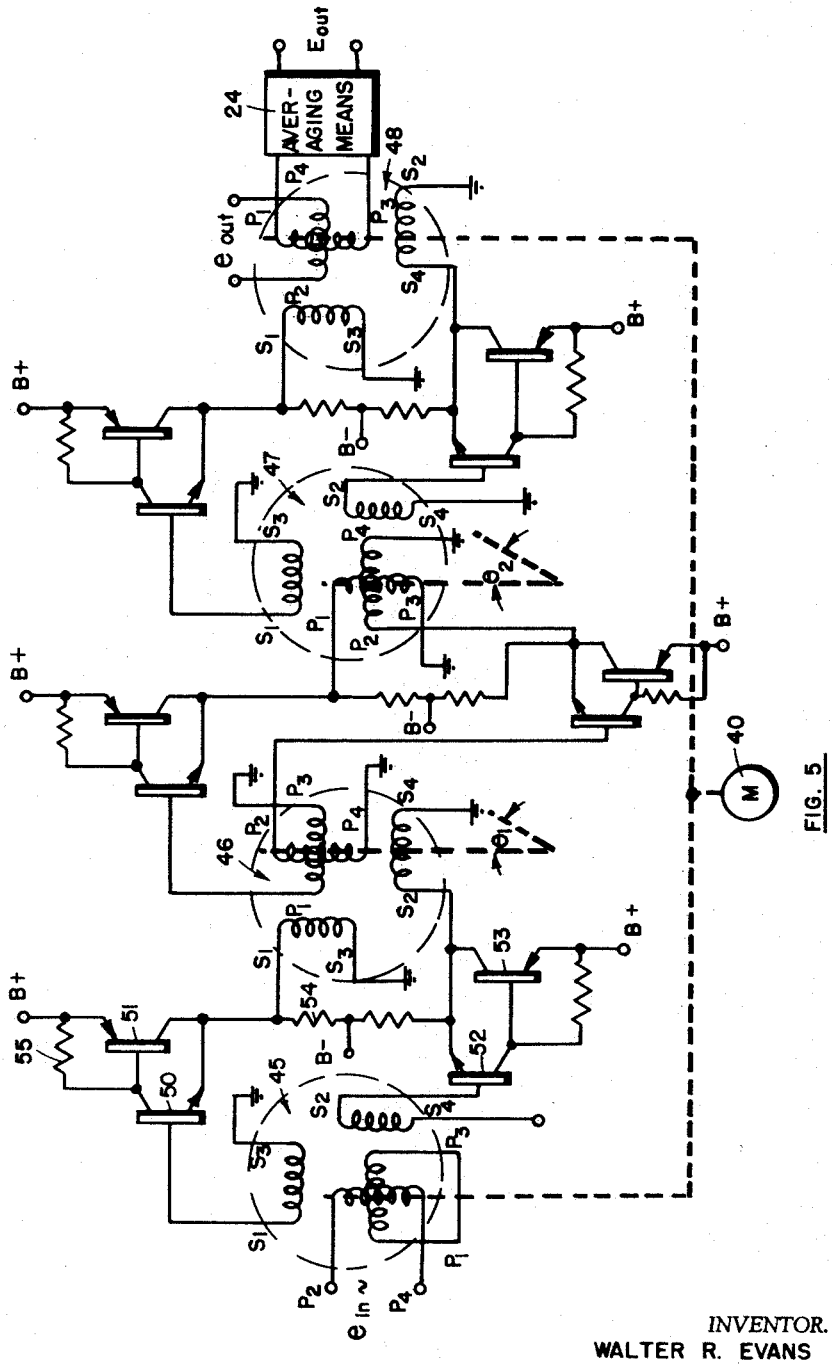
FIG. 5 is a schematic diagram of a further embodiment of this invention.

Referring now to FIG. 1, a typical synchro system is shown comprising a transmitter 10 and a control transformer 11. Transmitter 10 and control transformer 11 are shown schematically as including respective rotor windings 12 and 13 and respective stator windings 14, 15, 16, and 17, 18, 19. Following standard schematic representations of the synchros the rotor leads are indicated as $R_1$ and $R_2$ in both the transmitter and control transformer and the stator leads are shown as $S_1$, $S_2$, and $S_3$ in both synchro units also. As shown in FIG. 1, the typical synchro system includes connections between the respective stator windings of the transmitter 10 and control transformer 11, and a source of alternating current ($e_{in}$) applied to the rotor leads $R_1$ and $R_2$ of the transmitter 10. The output voltage $e_{out}$ measured across the rotor terminals $R_1$ and $R_2$ of the control transformer is an alternating signal having the same frequency as $e_{in}$ and an amplitude which is a sinusoidal function of the difference between the angle $\theta_1$ through which the rotor of the transmitter 10 is displaced and the angle $\theta_2$ through which the rotor of the control transformer is displaced, i.e., $e_{out}=e \sin(\theta_1-\theta_2)$, where the r.m.s. value of $e$ is some proportion of the r.m.s. value of the input voltage $e_{in}$, depending upon the losses in the synchro units and the turns ratio of their windings.

The synchro system shown in FIG. 1 is subject to errors which prevent an exact sinusoidal relationship between the output of the control transformer 11 and the difference in displacement angles $\theta_1$ and $\theta_2$. A typical synchro error curve is illustrated in FIG. 2a. In this curve is plotted the difference between the actual voltages appearing at the output of control transformer 11 and the theoretical voltages derived from equation $e_{out}=e \sin(\theta_1-\theta_2)$. This error curve comprises a one-cycle or fundamental error, second harmonic errors, and higher frequency errors (e.g., 6th and 12th harmonics). The one-cycle, or fundamental error, is caused by eccentricity or the amount by which the rotor rotates off the center of the stator bore. Second harmonic errors are caused by the amount by which the stator is not electrically round. Variation in mechanical roundness, burrs, or other lack of electrical symmetry are primary causes of this error. The high frequency errors result from the necessity of using stators and rotors made up with laminations having discreet slots. It may be observed from FIG. 2a that in a 360° rotation of the rotor, the errors are positive, negative and zero at different angular displacements. Thus, if some means were devised to average the errors over an entire 360° rotation of the rotor, the errors would substantially cancel each other thus affording a higher accuracy measurement at any particular displacement of the rotor.

An embodiment of my invention affording the desired averaging of errors is illustrated in FIG. 3. For convenience, the synchros shown in FIGS. 1 and 3 which may be identical bear the same identification numerals. Thus, transmitter 10 is shown with its stator leads connected to corresponding stator leads of a differential synchro 25. Synchro 26, also shown in FIG. 3, is also shown schematically as a differential synchro. It is to be noted, however, that my invention is not limited to the particular types of synchros illustrated in FIG. 3; for example, resolvers may be substituted for the transmitter, differential and control transformer synchros shown in FIG. 3.

Differential synchros 25 and 26 each comprise three distributed stator windings 27, 38, 29 and 30, 31, 32 spaced 120° apart with respective rotors also having three distributed windings 33, 34, 35 and 36, 37, 38 spaced 120° apart. The rotor leads of differential synchro 25 are connected to corresponding rotor leads of differential synchro 26 and likewise the stator leads of differential synchro 26 are connected to corresponding stator leads of control transformer 11. The particular interconnection of the rotor and stator leads of the differential synchros is largely a matter of choice, depending upon the impedance levels of the windings. In the synchro system of FIG. 3, the transmitter 10 is adapted to provide a rotation of the magnetic field axis in each of the synchro units. For this purpose, a motor 40 is connected to the rotor shaft of both the transmitter 10 and the control transformer 11. Differential synchros 25 and 26 provide a means for inserting an angular displacement for which an electrical analog is desired. Control transformer 11 provides a means for demodulating the output of the differential synchro 26. The output of control transformer 11 is connected to an averaging means 24 which averages the output signal from the control transformer 11 over one or more cycles of rotation of the motor 40. The averaging means may, for example, be as shown in FIG. 3, a demodulator 39 which combines the alternating signals $e_{in}$ and $e_{out}$ so as to obtain an output signal which does not alternate at the frequency of $e_{in}$. This direct current or slowly fluctuating signal is introduced into a simple R–C filter comprised of a capacitor 43 and resistor 44 designed to have a time constant as long as one or more cycles of motor 40. The output of the averaging means 24 comprises the desired output signal $E_{out}$ which varies in magnitude and polarity sinusoidally with the difference between the angular displacement $\theta_1$ and $\theta_2$.

In operation, the motor 40 revolves the rotors of both the transmitter 10 and control transformer 11 at the same constant rate. The axis of the pulsating magnetic field generated by the alternating current $e_{in}$ flowing through the rotor winding 12 of transmitter 10 rotates accordingly. By "pulsating" magnetic field is meant a magnetic field which varies, such as a field produced by an alternating current, which is sinusoidal for example. This rotating magnetic field cuts the stationary stator coils 14, 15 and 16 of the transmitter 10. The voltages appearing at the output of the stator leads $S_1$, $S_2$ and $S_3$ of the transmitter 10 are thus modulated with sinusoidal envelopes varying according to the speed of motor 40. The same modulating voltages excite the stator windings 27, 28 and 29 of different synchro 25 being utilized as the transmitting element into which an angular displacement $\theta_1$ is entered by appropriately turning the differential synchro rotor.

As noted above, the errors of a synchro are substantially cancelled when averaged over a rotor displacement of 360°. Thus, each time the motor 40 revolves once, the errors due to imperfect construction of the synchro transmitter 10 are substantially cancelled. Likewise, errors caused by imperfect construction of the differential synchro 25 are substantially cancelled even though the stator and rotor of the differential synchro are not constantly rotated relative each other, since the magnetic field, established by the exciting voltages connected to the differential stator windings 27, 28 and 29, rotates at the same rate as the motor 40. The axis of this magnetic field rotates with respect to both the stator and rotor of the differential synchro thus affording the same cancellation of errors as in the transmitter synchro 10. Similarly, the modulated voltages induced on the rotor windings 33, 34 and 35 of differential synchro 25 excite the rotor windings 36, 37 and 38 of the differential synchro 26. Accordingly, a rotating magnetic field is induced in the differential synchro 26 which rotates with respect to both the stator and rotor windings and substantially averages out the errors introduced by this synchro element. The stator of the control transformer 11 is likewise excited with modulating voltages which cause a rotating magnetic field in this synchro element. This magnetic field sweeps the stator windings 17, 18 and 19 of the control transformer thus cancelling errors in the same manner as described above. Control transformer 11 provides a demodulating means for removing the frequencies associated with the rate at which the magnetic field axis is rotated, i.e. the rate of motor 40. The rotor winding 13 of the control transformer is physically rotating at the same rate as the axis of the magnetic field. If this winding is at quadrature with the rotating magnetic field (when $\theta_1$ and $\theta_2$ are both zero) no voltage will appear across the leads $R_1$ and $R_2$ of the rotor winding 13. When the rotor of differential synchro 25 is angularly displaced with respect to the rotor of differential synchro 26, the rotor winding 13 of the control transformer will not be a quadrature with the rotating magnetic field and thus a voltage appears at the output leads $R_1$ and $R_2$ of the rotor winding 13. This output voltage $e_{out}$ alternates at the frequency of $e_{in}$ and varies in amplitude sinusoidally with the angular difference in shaft rotations $(\theta_1-\theta_2)$. Because of the synchronous rotation of the rotor winding 13 with the rotating magnetic field axis, substantially no frequencies appear at the output which reflects the rate at which the magnetic field axis is rotated. Averaging means 24 averages the output signal $e_{out}$ of the control transformer over at least one complete rotation of the magnetic field axis. For this reason the filter composed of capacitor 43 and resistor 44 is designed to have a time constant at least as long as a single rotation of the magnetic field axis. Usually it is preferable that the filter have a time constant 2 to 3 times the period of a complete rotation of the magnetic field axis. The demodulator 39 is provided since it is more convenient to average a D.-C. or slowly fluctuating signal than one which is alternating at a relatively high frequency. Of course, known techniques involving resonant circuitry may be utilized for directly averaging the alternating signal $e_{out}$ without first demodulating it. Because of the errors cancelled in each of the synchro elements, this output signal satisfied the equation $E_{out}=E \sin(\theta_1-\theta_2)$ more accurately than does the ordinary synchro system illustrated in FIG. 1.

A comparison between the accuracy afforded by my invention and an ordinary synchro system is graphically illustrated in FIGS. 2a and 2b. These curves were derived from measurements made on circuits identical to those of FIGS. 1 and 3 comprising synchros manufactured by the Kearfott Company, Inc., Little Falls, New Jersey. A model number R510 synchro was used as transmitter 10, a model number R500 synchro was used as control transformer 11, and model number R545 synchros were used as differential synchros 25 and 26. Each of these synchros is rated by the manufacturer as having a maximum error from electrical zero of 7 minutes. In the servo system of FIG. 3, the frequency of the alternating current $e_{in}$ was 400 cycles per second and the motor 40 had an output speed of 2 revolutions per second. These specific circuit parameters are by way of illustration only.

The error curve of the servo system shown in FIG. 1, when comprised of the particular synchros noted above, is illustrated in FIG. 2a, the maximum error from electrical zero being 5.2 minutes. The error curve of the servo system shown in FIG. 3, when comprised of the particular synchros above is illustrated in FIG. 2b, the maximum error from electrical zero being 0.96 minute. The improvement in accuracy afforded by this exemplary arrangement of my invention is thus a ratio of 5.3 to 1. This is of considerable importance since synchros having a maximum error from electrical zero in the order of 1 minute are not presently commercially available. Further, this invention is applicable in improving the accuracy of synchros having any degree of accuracy, i.e., a synchro having a maximum error from electrical zero of 20 minutes may be used to provide a synchro system having an accuracy comparable to a synchro system using synchros having a maximum error from electrical zero of less than 5 minutes. This is of economic importance since synchros having this small a maximum error are considerably more expensive because of the more precise manufacture required than synchros having maximum errors in the order of 20 minutes.

The frequency response of the synchro system illustrated in FIG. 3 is dependent upon the period for a complete rotation of the magnetic field axis and upon the frequency of the pulsating magnetic field, i.e., the frequency of the alternating signal, $e_{in}$. This means that the improved accuracy afforded by the rotated magnetic field is dependent upon the rate of motor 40. Generally speaking, the rate of change of the difference in rotation $(\theta_1-\theta_2)$ with respect to time should not exceed 10 percent of the rate of motor 40 in order to enjoy the maximum benefits from the error averaging, i.e., if for example motor 40 is operated at 2 cycles per second, $$\frac{d(\theta_1-\theta_2)}{dt}$$

should not exceed 12 cycles per minute.

The means for rotating the pulsating magnetic field has been illustrated in FIG. 3 as a constantly rotating motor 40. It may be noted that although a motor may be a convenient means for rotating the rotors of the synchros 10 and 11, any means would suffice which would rotate both the rotors in synchronism through a complete rotation whenever a measurement of accurate angular displacement is required. Thus, the driver could be de-energized except for the particular period when an accurate synchro system is required. After making a complete revolution, during which time the signal $E_{out}$ is recorded as an accurate measurement of $\theta_1-\theta_2$, the motor 40 or other driving means may be shut off until additional measurements are desired. The rotor of the transmitter 10 and the rotor of the control transformer 11 could also be driven by separate drives maintained in synchronism with each other, thereby obviating the necessity for any mechanical connection between the control transformer and the transmitter synchros. For example, separate synchronous electrical motors could be connected to the respective rotors of these synchro elements.

It will also be apparent to those skilled in the art that the pulsating magnetic field having a rotating axis could be generated electronically. For example, three signals displaced in phase 120° and corresponding in frequency to the rotation of motor 40 may be generated by a three-phase generator or by a phase splitter, each of these elements being known in the art. These signals could then be used to separately modulate an alternating carrier signal corresponding in frequency to $e_{in}$ in electronic modulators or multipliers known in the art. The outputs of the individual modulators, when coupled to the differential synchro 25 in FIG. 3, would serve to generate the desired pulsating magnetic field having a rotating axis. Similar electronic elements connected to the differential synchro 26 could be used to demodulate the signals generated in the windings of this synchro thereby obtaining $e_{out}$ indicative of the relative displacement between $\theta_1$ and $\theta_2$. Such apparatus is not shown in the preferred embodiments of this invention in view of their additional complexity. Synchro elements such as transmitter 10 and control transformer 11 are admirably suited for generating and demodulating the pulsating magnetic field having its axis rotated through at least one revolution since these elements are specifically manufactured for operation in synchro systems. Thus, problems in matching the magnetic field generating and demodulating apparatus to the angular displacement input synchros are minimized.

The synchro system described above, and illustrated in FIG. 3, may be incorporated in a servomechanism, a typical one being illustrated in FIG. 4. In this system, the control transformer 11 supplies an error signal $e_{out}$ from its rotor winding 13, through an averaging means 24, to a servo amplifier 41 that controls a D.-C. or A.-C. motor 42. The circuit is such that the speed of the motor 42 is proportional to the magnitude of the error voltage, and the direction of rotation is determined by the phase of the error voltage with respect to that of the line voltage. The output shaft of the motor 42 is connected to drive the rotor of the differential synchro 26. Thus, in the normal operation of the system, the rotor of the differential synchro 26 is driven to maintain the error voltage substantially at zero. When the error voltage is zero, the rotor displacement angle $\theta_2$ of the differential synchro 26 must be the same as the rotor displacement angle $\theta_1$ of the differential synchro 25 in order to satisfy the equation $e_{out}=e \sin(\theta_1-\theta_2)=0$. The rotor angular displacement of differential synchro 26 is a precise reproduction of the rotor angular displacement of differential synchro 25, the overall accuracy of the servomechanism being improved by the error averaging achieved by my unique synchro system.

As shown in FIG. 4, another and preferred type of averaging means 24 includes an integrator 49 composed of an amplifier 60 and feedback capacitor 61 connected to the output of the demodulator 39 and designed to average the demodulator output over one revolution of the axis of the pulsating magnetic field.

A further embodiment of my invention is shown in FIG. 5. In the synchro system illustrated in this figure, buffer amplifiers are utilized to isolate the individual synchros incorporated therein. Although these buffer stages are not required to achieve the error averaging noted above, it is sometimes desirable to incorporate these additional stages in order to prevent following synchros from loading those preceding. The buffer stages further obviate any undesirable feedback from succeeding synchro units to those preceding. Although the buffer stages are applicable in synchro systems which utilize any type of synchro unit, these stages are shown in combination with resolvers 45, 46, 47, and 48. As shown schematically in FIG. 5, the rotor and stator of each of the resolver units are each equipped with two independent windings whose axes are 90° apart. Output voltages of the resolver are accurate sine or cosine functions of the rotor shaft displacement. The rotor windings of each of the resolver units have leads $P_1$, $P_2$, $P_3$, and $P_4$ while the secondary or stator windings of each resolver have leads labeled $S_1$, $S_2$, $S_3$ and $S_4$. As noted in FIG. 5, a source of alternating voltages $e_{in}$ is applied to primary leds $P_2$ and $P_4$ of the resolver 45. The rotor of resolver 45 is connected as shown to motor 40 in order to constantly rotate the magnetic field induced by the current flowing in the rotor windings by the voltages $e_{in}$. Thus, resolver 45 is analagous in function to that of synchro transmitter 10 in FIG. 3 for modulating the voltages appearing at the stator leads $S_1$, $S_2$, $S_3$, and $S_4$ of the resolver 45.

Each of the stator windings of the resolver 45 are connected between ground and the input of separate buffer amplifiers comprising transistors 50, 51, 52, and 53. Each of the transistors 50, 51, and 52, 53 in the separate buffer stages are of opposite types. Thus, transistors 50 and 52 are n-p-n transistors, while transistors 51 and 53 are p-n-p transistors. Each of the transistors in each buffer stage are direct-coupled with a common source of B+ potential supplying the collector of transistor 50 through resistor 55 and the emitter of transistor 51. The emitter of transistor 50 and the collector of transistor 51 are connected to a common source of B− potential through a resistor 54. My invention is not limited to the particular buffer amplifier shown; rather, the application of many other amplifier circuits for the buffer stages will be obvious to those skilled in the art. The output of each of the foregoing buffer amplifiers is connected to a respective stator winding of the resolver 46. The primary or rotor coils of resolver 46 are connected to buffer stages identical to those in circuit between the resolvers 45 and 46. Thus, the rotor coils of resolver 46 are connected to the rotor coils of resolver 47 through buffer stages and in like manner the stator coils of resolver 47 are connected to the stator coils of resolver 48 through buffer stages. Each of the buffer stages shown in FIG. 5 may be identical to the transistor stages 50, 51 and 52, 53. The particular interconnection of the rotor and stator leads of the resolvers is largely a matter of choice depending upon the impedance levels of the windings.

Resolvers 46 and 47 serve functions analogous to those of the differential sychros 25 and 26 previously described and illustrated in FIG. 3. Thus, a shaft angular displacement may be introduced into one or both of the resolvers 46 and 47 in order to obtain an electrical analog of the displacement difference at the output of the resolver 48. The rotor of resolver 48 is directly connected to the rotor 49 and thus serves a function analogous to that of the control transformer 11 in FIG. 3, i.e., resolver 48 serves as a demodulator for obtaining an output signal $e_{out}$. Following the resolver 48 is an averaging means 24 which may be identical to those previously described and illustrated in FIGS. 3 and 4, thereby obtaining an output signal $E_{out} = E \sin(\theta_1 - \theta_2)$.

Error averaging is accomplished in the circuit of FIG. 5 in the same manner as in the previously described circuit of FIG. 3. Thus, a rotating magnetic field is induced in each of the resolver units which sweeps the windings therein and averages the positive and negative errors over a 360° rotation of the magnetic field. Thus, as noted above, since the errors are both positive and negative, there is a substantial cancellation of the errors, thus providing a synchro system of substantially improved accuracy.

Figure 6:
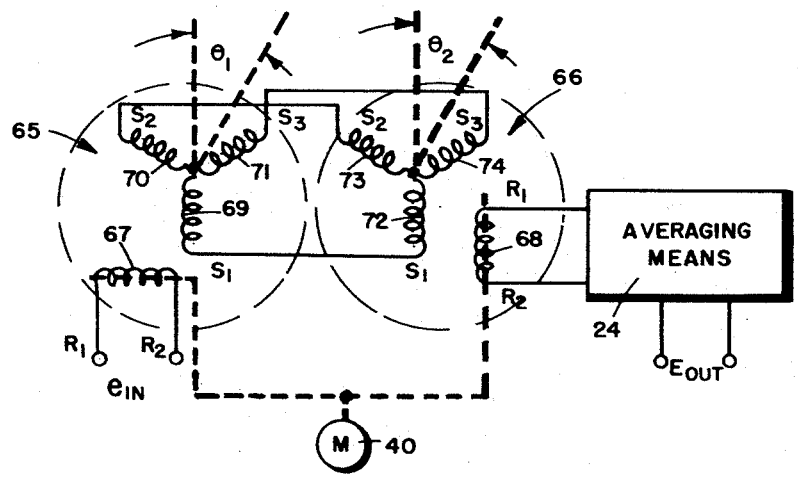
FIG. 6 is a schematic diagram of another embodiment of this invention.

An additional embodiment of this invention is shown in FIG. 6. Synchros 65 and 66 differ in mechanical construction from the synchros heretofore shown in that their stators are mounted on bearings. Thus, the stators, as well as the rotors of synchros 65 and 66 are free to rotate. The stators of the synchros 65 and 66 are shown schematically as being angularly displaceable through respective rotations $\theta_1$ and $\theta_2$. Examples of this type of synchro are illustrated and described on pages 51 and 87 of the United States Navy Ordnance pamphlet No. 1303, entitled "United States Navy Synchros," dated December 15, 1944. Synchro 65 comprises three distributed stator windings 69, 70 and 71 spaced 120° apart and rotor winding 67. Likewise, synchro 66 comprises three distributed stator windings 72, 73 and 74 spaced 120° apart and rotor winding 68. The rotor winding of synchro 65 is energized by the alternating signal $e_{in}$ for providing a pulsating magnetic field having its axis aligned with the rotor winding 67. Motor 40 is connected to the rotor of synchro 65 so as to rotate the rotor winding 67 and in turn rotate the axis of the magnetic field. The stator leads of synchro 65 are connected to corresponding stator leads of synchro 66. Motor 40 is also connected to drive the rotor winding 68 of synchro 66. The output of synchro 66 is connected to an averaging means 24 which may be identical to those previously described and illustrated in FIGS. 3 and 4.

The operation of the synchro system shown in FIG. 6 is as follows: The pulsating magnetic field generated by alternating signal $e_{in}$ through rotor winding 67 is repeatedly swept through 360° rotations thereby cutting the stator windings 69, 70 and 71. Synchro 65 serves as the transmitting element in which the stator of the same may be rotated through an angular displacement of $\theta_1$. The voltages appearing at the output of the stator leads $S_1$, $S_2$ and $S_3$ of the synchro 65 are modulated with sinusoidal envelopes varying according to the speed of motor 40. The same modulating voltages excite the stator windings 72, 73 and 74 thereby inducing a pulsating magnetic field having a rotating field axis in the receiving or control transformer synchro 66. If the rotors of the synchros 65 and 66 are rotated in synchronism so as to retain their quadrature relationship, the voltage appearing at the output of the rotor winding 68 will be substantially zero if the respective stator windings of the transmitting and receiving synchros are each in the same position relative to their rotor windings. However, if the stators of either of these synchros are rotated on their associated bearings, an output signal will appear at the output of the rotor winding 68 indicative of the angular displacement of the stators relative to each other, i.e., $e_{out} = e \sin(\theta_1 - \theta_2)$.

Error averaging is accomplished in the circuit of FIG. 6 in the same manner as in the previously described embodiments of this invention. A rotating magnetic field is induced in each of the synchros 65 and 66 which sweeps the windings therein and averages the positive and negative errors over a 360 rotation of the magnetic field. Average means 24 serves to average the output of the rotor winding 68 over a period of at least one revolution of the axis of the pulsating magnetic field. Accordingly, the output of the average means 24 is a very accurate measurement of the angular displacement of one of the stators relative to the other.

It will be apparent to those skilled in the art that the embodiments previously described and illustrated in FIGS. 3, 4 and 5 may be further modified by substituting one ore more synchros shown schematically in FIG. 6 having rotatably mounted stators as well as rotors. The rotating magnetic field can then be produced by either rotating the stator or rotor of the field generating synchro. Another application of this type of synchro would be to provide additional inputs in each of the synchro elements of the FIGS. 3, 4 and 5 for introducing additional angular inputs. So long as a pulsating magnetic field having an axis which is rotated through at least one revolution is generated within the synchro elements, an averaging of the errors, caused by imperfect construction of the synchros, will occur thereby providing more accurate measurements of the angular displacements entered into the synchros by the various inputs whether they be relative rotations of the synchro rotors, stators, or both.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A synchro system comprising: a first variable transformer means having first rotor and first stator windings which couple with each other according to a function of the relative angular displacement between said first rotor and stator windings; means for exciting said transformer means with a first pulsating magnetic field; means for rotating said field through at least one revolution; a second variable transformer means having second rotor and second stator windings which couple with each other according to a function of the relative angular displacement between said second rotor and stator windings; means for coupling said second variable transformer means to said first variable transformer means so that a second pulsating magnetic field rotating in synchronism with said first field excites said second variable transformer means; and means, synchronized with said means for rotating said first field, for removing the component of rotation, caused by said means for rotating said first field, from said second field.

2. A synchrosystem comprising first coupled rotor and stator windings, second coupled rotor and stator windings, third coupled rotor and stator windings, and fourth coupled rotor and stator windings, means for supplying an alternating input to said first rotor windings for establishing a pulsating magnetic field, means for rotating said first rotor windings so that said pulsating magnetic field cuts said first stator windings, means for connecting one of said second windings to said first stator windings, means for connecting the other of said second windings to one of said third windings, and means connecting the other of said third windings to one of said fourth windings so that a pulsating magnetic field cuts said second, third and fourth windings, means for rotating said fourth rotor winding according to the rotation of said first rotor winding so that the output of the other of said fourth windings comprises a signal which is an error-cancelled function of the angular displacement between said second and third rotor windings.

3. A synchro system comprising a transmitter synchro, a first differential synchro coupled to said transmitter synchro, a second differential synchro coupled to said first differential synchro, a control transformer synchro coupled to said second differential synchro, a source of alternating current connected to the rotor of said transmitter synchro, and motor means for driving the rotors of said transmitter and said control transformer synchros to produce a rotating pulsating magnetic field in said synchros, and means for obtaining an output signal from said control transformer synchro, whereby said output signal is a sinusoidal function of the difference of angular displacement between the rotor of said first differential synchro and the rotor of said second differential synchro.

4. A synchro system comprising first, second, third and fourth resolvers, buffer amplifiers connecting said second resolver to said first resolver, said third resolver to said second resolver, and said fourth resolver to said third resolver, means for constantly driving the rotors of said first and fourth resolvers, alternating current means connected to the rotor winding of said first resolver, whereby a voltage is obtained at the output of said fourth resolver which is a sinusoidal function of the difference in angular displacement of the rotor of said second resolver and the rotor of said third resolver.

5. A servomechanism comprising a first synchro means having a rotor and an output voltage which varies as a function of the angular displacement of said rotor, second synchro means connected to said first synchro means having a rotor and an output voltage which varies as a function of the difference in angular displacement of the rotor of said first synchro and the rotor of said second synchro, means for establishing a pulsating magnetic field in said first and second synchros and for sweeping the axis thereof through at least one revolution, means responsive to the output voltage of said second synchro for averaging said voltage over a period of at least one revolution of the axis of said pulsating magnetic field, means connected to said averaging means for obtaining a shaft rotation which varies as a function of said difference in angular displacement between said first and second synchro rotors, means for rotating the rotor of said second synchro in response to said shaft rotation so that the output voltage of said second synchro is maintained substantially at zero.

6. A synchro system comprising a first variable transformer having first rotor and stator windings, a second variable transformer having second rotor and stator windings, said first and second stator windings being electrically interconnected, means for generating a pulsating magnetic field synchronously rotating in all of said windings, input means for changing the angular relation of the rotor and stator of one of said transformers, and output means coupled with one of said transformers.

7. In combination: an input synchro, an output synchro electrically coupled therewith, means for inducing in both of said synchros a rotating and pulsating magnetic field, and an input shaft independent of said inducing means coupled with said input synchro.

8. A synchro system comprising a first variable transformer having first and second windings rotatably mounted relative one with the other, a second variable transformer having third and fourth windings rotatably mounted relative one with the other, said second and third windings being electrically interconnected, alternating current means electrically connected to said first winding, means for rotating said first and fourth windings through at least one revolution, and means responsive to the signal on said fourth winding for averaging said signal over a period of at least one revolution of said first and fourth windings.

9. A synchro system comprising:
a plurality of synchros;
at least one buffer amplifier stage, connected to couple said synchros in sequence;
means for establishing a pulsating magnetic field within each of said synchros;
means for rotating, in synchronism, said magnetic fields of said synchros; and
means for obtaining an output signal from said synchro system, averaged over a period of a predetermined portion of the period of rotation of said magnetic fields.

References Cited in the file of this patent
UNITED STATES PATENTS

| | | |
|---|---|---|
| 2,446,532 | Edwards | Aug. 10, 1948 |
| 2,651,010 | Wendt | Sept. 1, 1953 |
| 2,753,498 | Gray | July 3, 1956 |
| 2,849,671 | Stefan | Aug. 26, 1958 |

OTHER REFERENCES

James, Nichols, and Phillips: Theory of Servomechanism, page 82, Fig. 3.4, McGraw-Hill, New York, 1947.

Lauer, Lesnick, Matson: Servomechanism Fundamentals, page 33, Fig. 2.12 and 1st paragraph, McGraw-Hill, 1947, New York.

Greenwood, Holdam, MacCrae: Electronic Instruments, page 385, Fig. 12–15, McGraw-Hill, New York, 1948.

Cage, J. M.: Theory and Application of Industrial Electronics, pages 85, 86 and page 91, McGraw-Hill, New York, 1951.

Ahrendt, W. R.: Servomechanism Practice, pp. 39–41, McGraw-Hill, New York, 1954.